United States Patent [19]

Hodgson

[11] 4,056,226
[45] Nov. 1, 1977

[54] LIQUID MANURE SPREADER

[75] Inventor: James H. Hodgson, Vinton, Iowa

[73] Assignee: Chromalloy American Corporation, New York, N.Y.

[21] Appl. No.: 709,662

[22] Filed: July 29, 1976

[51] Int. Cl.² .................................. A01G 25/09
[52] U.S. Cl. ......................................... 239/172
[58] Field of Search ............... 239/146, 148, 163, 170, 239/172, 175, 176; 222/176, 178

[56] References Cited

U.S. PATENT DOCUMENTS

| | | | |
|---|---|---|---|
| 3,420,452 | 1/1969 | Vaughan | 222/178 X |
| 3,587,932 | 6/1971 | Baum | 222/178 |
| 3,858,761 | 1/1975 | O'Dell | 239/172 |

FOREIGN PATENT DOCUMENTS

| | | | |
|---|---|---|---|
| 427,381 | 6/1967 | Switzerland | 239/172 |

Primary Examiner—John J. Love
Attorney, Agent, or Firm—Wegner, Stellman, McCord, Wiles & Wood

[57] ABSTRACT

A liquid manure spreader has a wheeled chassis attachable to a farm tractor, a tank on the chassis, a centrifugal pump on a longitudinal axis immediately inside the front lower extremity of the tank and having a drive shaft extending through the front of the tank for attachment to a tractor power take-off. A discharge pipe extends upwardly from the pump just inside the tank front wall to a T at the top of the tank from one branch of which a horizontal discharge pipe extends through the rear of the tank and has a spray nozzle on its extremity. The other branch of the T extends through the front of the tank and a discharge line on said other branch may be plugged or may have a hose connected to it for supplying a liquid fertilizer injector that is carried on the tractor three point hitch.

4 Claims, 3 Drawing Figures

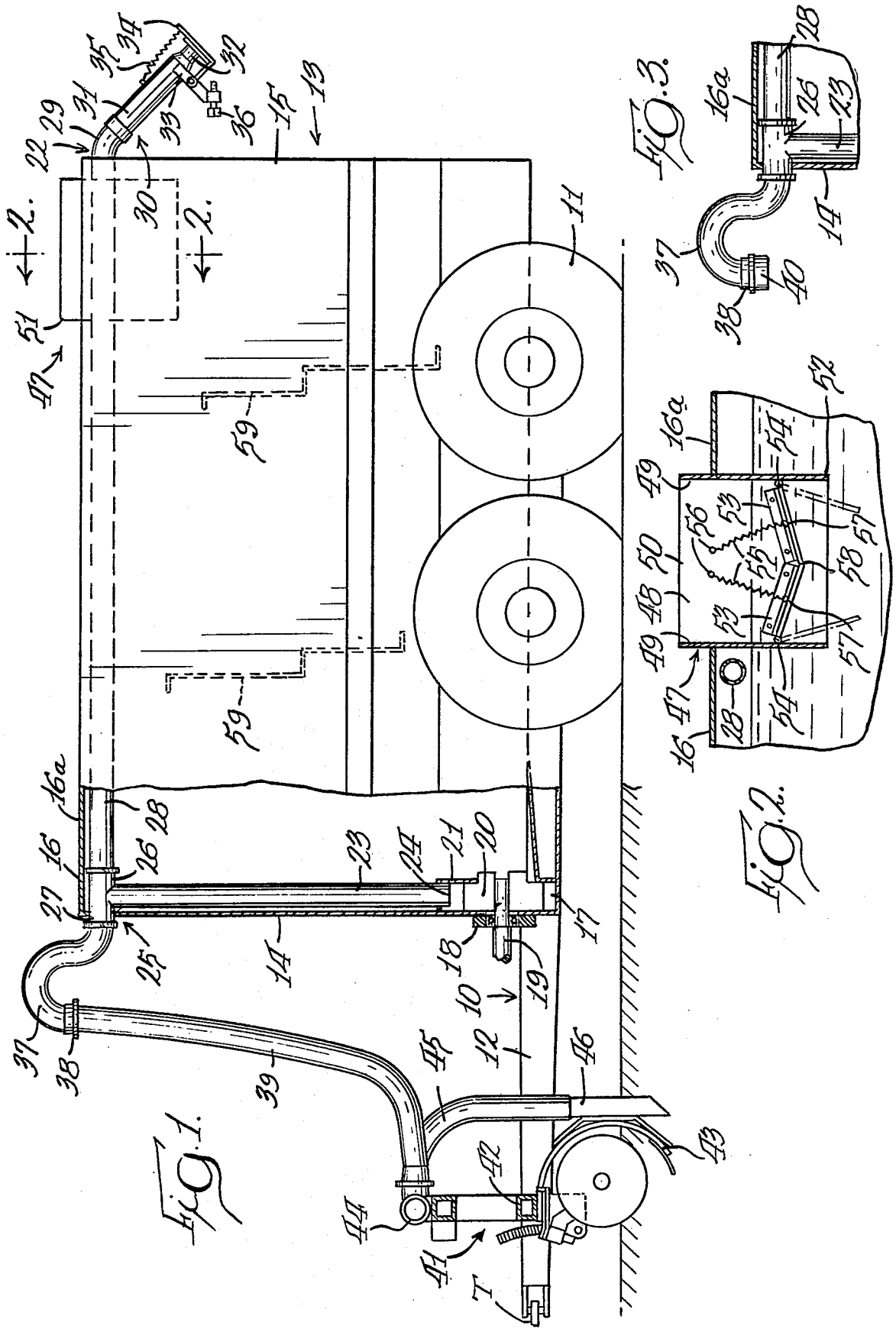

LIQUID MANURE SPREADER

CROSS-REFERENCE TO RELATED APPLICATION

Parts of the structure disclosed but not claimed in this application are disclosed and claimed in applicant's copending application for U.S. Patent Ser. No. 709,663, filed July 29 1976.

Some relatively recent developments in farming practices have created a need for devices which are capable of handling a large quantity of liquid manure which may vary from a liquid containing relatively small amounts of suspended solid to a fairly thick slurry. In large cattle operations it has been found convenient and very effective to blend manure and urine removed from the cattle holding areas with wash water and additional water to create a slurry which is stored in large holding tanks with agitators to prevent the solids from settling to the bottom of the tank as a sludge. The slurry may then be pumped from the holding tank into a mobile tank from which it may be discharged either through a nozzle or through injectors which leave it in the soil below ground level.

There is a great need for simple, rugged, high capacity slurry spreaders for use in modern large scale farming operations.

SUMMARY OF THE INVENTION

The principal object of the present invention is to provide a large capacity, tank type slurry spreader which possesses structural and operational advantages not found in the prior art.

Another object of the invention is to provide a liquid manure spreader which can be used for surface spreading through its own nozzle system, or which can be used as the supply source for a liquid manure injector mounted upon the three point hitch of a farm tractor behind which the present device is towed.

THE DRAWINGS

FIG. 1 is a side elevational view, partly in section, of the device of the invention showing its relationship to a liquid manure injector mounted on the three point hitch of a tractor to which the apparatus of the invention is hitched for towing;

FIG. 2 is a fragmentary sectional view on an enlarged scale taken substantially as indicated along the line 2—2 of FIG. 1; and FIG. 3 is a fragmentary sectional view of the front upper portion of FIG. 1, showing the discharge piping disconnected from the liquid manure injector and plugged for spray discharge.

DETAILED DESCRIPTION OF THE INVENTION

Referring to the drawings in detail, the apparatus of the present invention consists of a chassis, indicated generally at 10, which is carried upon dual wheels 11 and has a draft tongue 12 for connection to a tractor draw bar T. Mounted upon the chassis 10 is a cylindrical tank 13. In a commercial structure embodying the invention the tank 13 has a capacity of nearly 3300 gallons of liquid, which is a load substantially in excess of 13 tons.

The tank 13 has a front wall 14, a back wall 15, and a cylindrical sidewall 16 which is welded to the front and back walls 14 and 15. At the front of the tank is a sump 17.

Near the bottom of the tank front wall 14 is a sealed bearing 18 in which a shaft 19 is journalled, and keyed to the rear of the shaft immediately inside the front wall 14 is a combined impeller and agitator pump 20 which is carried in a pump casing 21 and has its lower portion in the sump 17. The shaft 19 is adapted for attachment to a tractor power takeoff.

A discharge pipe, indicated generally at 22, includes a vertical run 23 which has its lower end 24 in the top of the pump casing 21; a tee 25 at the upper end of the vertical run 23 immediately beneath the upper extremity 16a of the tank, said tee having a first branch 26 that extends rearwardly and a second branch 27 that extends through an opening in the front wall 14 of the tank and is sealed in said opening; and a horizontal run 28 which extends rearwardly from the first branch 26 of the tee and has its rearward portion 29 extending through and sealed in an opening in the rear wall 15 of the tank. A nozzle assembly, indicated generally at 30, is mounted on the rear extremity of the projecting end portion 29 of the horizontal run 28.

The nozzle assembly 30 includes a tubular body 31 with a restricted end portion 32, and a bracket 33 upon which a nozzle closure 34 is pivotally mounted. A tension spring 35 normally retains the nozzle closure 34 in the closed position seen in FIG. 1 where it seals the open end of the nozzle assembly tubular body 31, and the tension on the spring 35 is such that the pressure of liquid driven by the impeller 20 swings the nozzle closure 34 downwardly and outwardly to a spreading position in which the closure plate 34 acts as a spray plate to spread the discharging liquid in a fan-like pattern about the nozzle. An adjustable stop 36 on the bracket 33 determines the extent to which the nozzle closure plate 34 may be opened under pressure.

Connected to the second branch 27 of the tee 25 is a gooseneck 37 at the free end of which is a fitting 38 which is internally threaded to selectively receive either a delivery hose 39 or a threaded plug cap 40 (FIG. 3). The delivery hose 39 serves an injector, indicated generally at 41, which is carried upon the three point hitch (not shown) of the tractor T. The injector constitutes no part of the present invention, and thus is described only broadly as including a transverse tool bar 42 for a plurality of laterally spaced chisels 43, a transverse manifold 44 supported upon a frame at the top of the tool bar to receive liquid manure from the hose 39, and a set of delivery hoses 45 and injector nozzles 46 which are aligned with the chisels 43.

At the rear upper portion of the tank 13 is a filler structure, indicated generally at 47, which is mounted in the top portion 16a of the cylindrical tank wall 16, and which consists of a filler opening 48 defined by two parallel sidewalls 49 and two parallel connecting walls of which only one wall 50 is seen in FIG. 2. The walls 49 and 50 defining the filler opening are seen to have an upper portion 51 projecting above the cylindrical tank wall 16, and a lower portion 52 which extends a substantial distance into the upper portion of the tank.

A pair of opposed filler doors 53 are pivotally mounted at 54 upon the parallel sidewalls 49, and tension springs 55 have their upper ends anchored at 56 on the connecting walls 50 and have their lower ends connected at 57 to the opposed filler doors 53. The springs 55 bias the filler doors 53 lightly to the closed position of FIG. 2 in which their free edges 58 abut when the filler doors are in a downwardly inclined position; and the tension of the springs 55 is such that the pressure of liquid being delivered to the filler opening 48 swings the filler doors 53 downwardly for substantially splash free filling of the tank 13. When the liquid pressure is cut off, the springs 55 automatically return the filler doors 53 to the closed position seen in FIG. 2, and the doors prevent splashing of liquid manure when the apparatus is in motion.

Within the tank 13 are baffles 59 which control sloshing of liquid in the tank when the apparatus is moving, and which also provide rigidity for the tank structure.

The foregoing detailed description is given for clearness of understanding only and no unnecessary limitations should be understood therefrom as modifications will be obvious to those skilled in the art.

I claim:

1. In a liquid manure spreader which has a wheeled chassis with an enclosed tank mounted thereon, and a power driven pump for discharging liquid manure from the tank through spray nozzle means at the rear of the tank, the improvement comprising:

a pump casing within the tank at the front lower extremity thereof, the rear of said casing being open to the tank;

a centrifugal pump in said casing which is on a longitudinal axis and has a drive shaft extending through the front wall of the tank for connection to a power source;

and a discharge pipe which has a vertical run extending from the top of the pump casing within the front of the tank, and a horizontal run which extends from the top of said vertical run inside the top of the tank, and through the rear of the tank, the spray nozzle means being on said horizontal run of the discharge pipe outside the rear of the tank.

2. The improvement of claim 1 which includes a T at the top of the vertical run of the discharge pipe, the horizontal run connects to one branch of said T, the other branch of said T extends through the front of the tank, and a discharge line is connected to said other branch, said discharge line having an open end forward of the tank, and a threaded fitting on said open end which is adapted to selectively receive a threaded plug or a hose which delivers liquid manure to an injector which is forward of the wheeled chassis.

3. The improvement of claim 2 in which the wheeled chassis has draft means adapted for attachment to a farm tractor, the pump drive shaft is adapted to be connected to a power take-off of said farm tractor and the injector is carried upon a three point hitch of said tractor.

4. The improvement of claim 1 in which there is a sump at the front of the tank and the lower portion of the pump casing and of the pump are in said sump.

* * * * *